United States Patent [19]

Sears

[11] Patent Number: 4,938,498

[45] Date of Patent: Jul. 3, 1990

[54] VEHICLE SUSPENSION

[75] Inventor: Kenneth J. Sears, Attleborough, England

[73] Assignee: Group Lotus plc, Norfolk, England

[21] Appl. No.: 246,231

[22] Filed: Sep. 19, 1988

[30] Foreign Application Priority Data

Sep. 21, 1987 [GB] United Kingdom ............... 8722199
Nov. 2, 1987 [GB] United Kingdom ............... 8725607

[51] Int. Cl.$^5$ .............................................. B60G 7/02
[52] U.S. Cl. ................................................... 280/675
[58] Field of Search ............... 280/688, 701, 675, 674

[56] References Cited

U.S. PATENT DOCUMENTS

| | | | |
|---|---|---|---|
| 3,520,554 | 7/1970 | Ravenel | 280/124 |
| 4,157,840 | 6/1979 | Kroniger et al. | 280/688 |
| 4,664,407 | 5/1987 | Griffin, Sr. | 280/689 |
| 4,744,586 | 5/1988 | Shibahata et al. | 280/689 |

FOREIGN PATENT DOCUMENTS 0265675 9/1987 European Pat. Off. .
2281242 3/1976 France .

Primary Examiner—Richard A. Bertsch
Attorney, Agent, or Firm—Seidel, Gonda, Lavorgna & Monaco

[57] ABSTRACT

The suspension comprises a member, on which a road wheel of the vehicle is rotatably mounted, and spaced upper and lower pivotal links extending from the member mounting the wheel to the structure of the vehicle. The lower link is L-shaped and has a first limb extending outwardly from the vehicle structure to the wheel-mounting member and a second limb extending generally-longitudinally of the vehicle and is attached to its structure. The suspension also includes a control link which extends between the vehicle structure and the wheel mounting member to control the steer alignment of the wheel-mounting member. The inboard end of the control link lies outboard of the line and can be either higher or lower than that line. The location and geometry of the control link are chosen to produce desired changes in steer alignment of the wheel-carrying member during suspension deflections of the vehicle wheel.

9 Claims, 2 Drawing Sheets

VEHICLE SUSPENSION

BACKGROUND OF THE INVENTION

This invention relates to suspensions for non-steered wheels of motor vehicles, for example motor cars.

It is fundamental for safe roadholding of a motor vehicle and to ensure good driving security that the tracking direction of the wheels must at all times be accurately controlled according to optimized characteristics.

DESCRIPTION OF PRIOR ART

Previous proposals which seek to satisfy this requirement have included system which require complex analysis because the resolution of the reaction forces, and the subsequent motion of the wheel carrier member, is determined by the interacting effects of many different component parts of the suspension system, each of which has particular stiffness and damping characteristics. Such suspension systems therefore tend to involve many interrelated components operating on a cumulative rather than individual basis. As a result, the functioning of the suspension system under each primary mode of operation is determined by a complex interaction between several suspension components.

SUMMARY OF THE INVENTION

It is an object of the present invention to provide a vehicle suspension in which the location and geometry of a control link of the suspension can be chosen to produce desired change in steer alignment of the wheel-carrying member during suspension deflections.

It is a further object to provide a vehicle suspension in which each of its primary modes of operation is largely defined by an element of the suspension discrete to that mode.

It is also an object to provide a vehicle suspension in which at least one suspension element displays characteristics required for a particular mode of operation discrete to that mode.

A further object is to provide a vehicle suspension in which the motion of a wheel-carrier in one direction is determined primarily by one component which does not influence, to a primary extent, the wheel-carrier motion in any other mode.

Yet another objection is to provide a vehicle suspension in which a wheel-carrier of the suspension is located transversely with relatively little compliance but is located longitudinally with a relatively large compliance.

The present invention provides a vehicle suspension comprising a member on which a road wheel of the vehicle can be rotatably mounted and spaced upper and lower pivotal links extending from the wheel-mounting member to the structure of the vehicle, the lower link being L-shaped and having a first limb extending outwardly from the vehicle structure to the wheel-mounting member and a second limb which extends generally-longitudinally of the vehicle and is attached to the structure at first and second locations along its length, the suspension including a control link which extends between the vehicle structure and the wheel-mounting member to control the steer alignment of the wheel-mounting member.

Preferably, the relative compliances of the first and second attachments of the lower link to the vehicle structure are chosen so that the wheel is located transversely with relatively little compliance but a relatively large compliance is associated with its longitudinal alignment. This allows accurate control of the wheel camber whilst at the same time providing desirable ride characteristics. Further, the upper link is preferably attached to the vehicle structure with relatively little compliance both longitudinally and transversely. This allows the point of attachment of the upper link to the wheel-carrying member to form a reference point for the steering geometry and restrain undesirable suspension movement tending to rotate the wheel-carrying member about the axis about which the wheel rotates.

Advantageously, the control link is located rearwardly, relative to the forward direction of vehicle travel, of the axis of the wheel. More advantageously, the control link is located lower than the wheel axis.

In preferred arrangements, the inboard mounting of the control link is located longitudinally between the first and second attachments of the lower link to the vehicle structure but is displaced vertically (either to above or below) from the line between these attachments. It is also preferred that the inboard mounting of the control link should lie outboard of the line between the first and second attachments of the lower link. In any event, it is preferred that the control link should not lie in the plane defined by the first and second limbs of the lower link.

At least some of the attachments of the upper lower links, and preferably also the control link, may conveniently be by way of a sub-frame, for example as described in our European Patent Application 898306803.3 which is incorporated herein by reference. This need not be the case however and direct attachment to the vehicle structure is equally possible.

BRIEF DESCRIPTION OF THE DRAWINGS

For the purpose of illustrating the invention, there is shown in the drawings a form which is presently preferred; it being understood, however, that this invention is not limited to the precise arrangements and instrumentality shown.

DESCRIPTION OF THE PREFERRED EMBODIMENT

Figure 1:
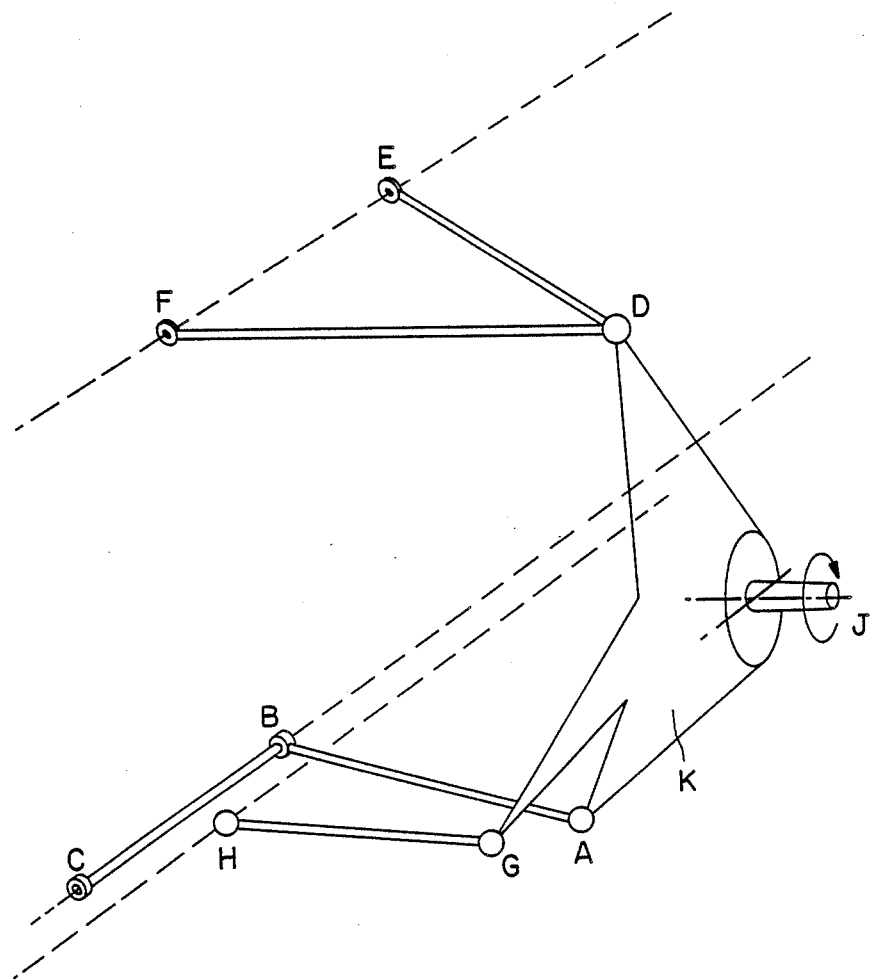
FIG. 1 is a partially diagrammatic view of one embodiment of the present invention.

The suspension shown in the drawing has a hub carrier K which supports a rear road wheel (not shown) of the car for rotation about a horizontal axis J, rotation during forward travel of the vehicle being in the direction of the arrow.

The hub carrier K is attached at its upper end D to the chassis or body of the car by a wishbone which is pivoted at D, E and F so that it can undergo pivotal movement about an axis which extends horizontally and generally longitudinally of the vehicle. At its lower end A, the hub carrier K is attached to the chassis or body by an L-shaped lower link ABC which is pivotally-mounted on the chassis or body at C and B and pivotally-attached to the hub carrier at A. A spring and damper (not shown) extend between the wishbone DEF, or alternatively the portion AB of the lower link, and the body or chassis of the car.

The L-shaped link ABC is attached to the hub carrier at A and to the chassis or body at B with little compliance but is attached to the chassis or body with greater compliance at C. This arrangement allows the suspension to accommodate a considerable degree of wheel movement in the longitudinal direction whilst presenting a high resistance to lateral wheel movement. In this way, desirable ride characteristics are provided.

Also at the lower end of the hub carrier K but spaced from the pivot A, the hub carrier is attached to the vehicle chassis or body by a control link GH which is pivotally attached to the hub carrier and vehicle at G and H respectively. The inboard attachment joint H of the control link GH is located between B and C but below and outboard of a line extending between B and C. The control link GH does not lie in the plane defined by A, B and C.

Figure 2:
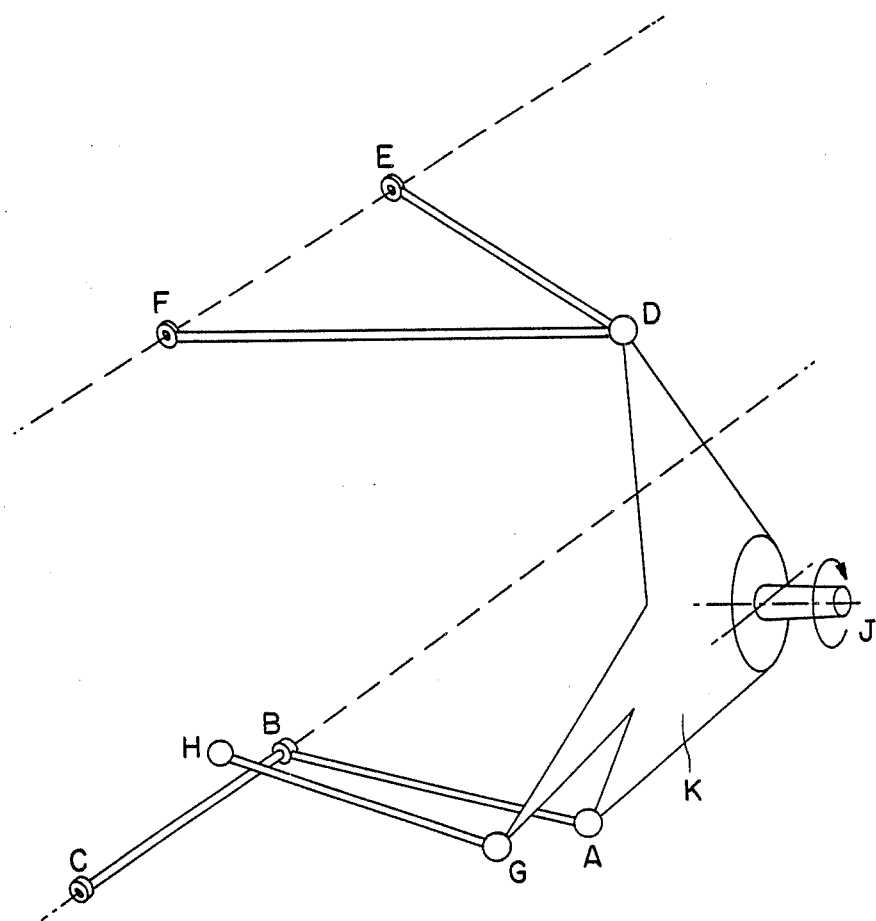
FIG. 2 is a partially diagrammatic view of a modified embodiment of the present invention.

In the modified embodiment, shown in FIG. 2, the inboard attachment point H of the control link GH is located between B and C but above a line extending between B and C. Again, the control link GH is out of the plane defined by A, B and C. The point H is also outboard of the line BC.

In the unmodified and modified embodiments, the link GH controls the movement of the hub carrier K about the generally-vertical pivot axis passing through the pivots A and D. By choice of the locations of the points G and H, it is possible to arrange for desirable changes in steer alignment of the wheel, that is pivotal movement about the axis AD, to occur in response to the longitudinal and vertical movements of the wheel which occur in operation of the suspension. Such longitudinal movements are allowed for by the compliance of pivot C as mentioned above. Vertical movements occur as a result of suspension deflections during travel of the vehicle.

Although the suspension described has the link GH located behind the axis of the wheel, relative to the direction of forward movement of the vehicle, location in front of the wheel axis is possible as an alternative.

It will be evident that those skilled in the art may make numerous modifications of the specific embodiment described above without departing from the present inventive concepts. It is accordingly intended that the invention shall be construed as embracing each and every novel feature and novel combination of features present in or possessed by the article herein described and that the foregoing disclosure shall be read as illustrative and not as limiting except to the extent set forth in the claims appended hereto.

I claim:

1. A vehicle suspension comprising a member on which a road wheel of the vehicle can be rotatably mounted and spaced upper and lower pivotal links extending from the wheel-mounting member to the structure of the vehicle, the lower link being L-shaped and having a first limb extending outwardly from the vehicle structure to the wheel-mounting member and a second limb which extends generally-longitudinally of the vehicle and is attached to the structure at first and second locations along its length, the suspension including a control link extending between the vehicle structure and the wheel-mounting member to control the steer alignment of the wheel-mounting member.

2. A suspension according to claim 1, in which the relative compliances of the first and second attachments of the lower link to the vehicle structure are such that the wheel is located transversely with relatively small compliance but a relatively large compliance is associated with its longitudinal alignment.

3. A suspension according to claim 1, in which the upper link is attached to the vehicle structure with relatively small compliance both longitudinally and transversely.

4. A suspension according to claim 1, in which the control link is located rearwardly, relative to the forward direction of vehicle travel, of the axis of the wheel.

5. A suspension according to claim 1, in which the control link is positioned lower than the wheel axis.

6. A suspension according to claim 1, in which the inboard mounting of the control link is located longitudinally between the first and second attachments of the link to the vehicle structure and displaced from an imaginary line between the first and second attachments.

7. A suspension according to claim 6, in which the said inboard mounting is outboard of the said line.

8. A suspension according to claim 6, in which the said inboard mounting is above the said line.

9. A suspension according to claim 6, in which the said inboard mounting is below the said line.

* * * * *